UNITED STATES PATENT OFFICE.

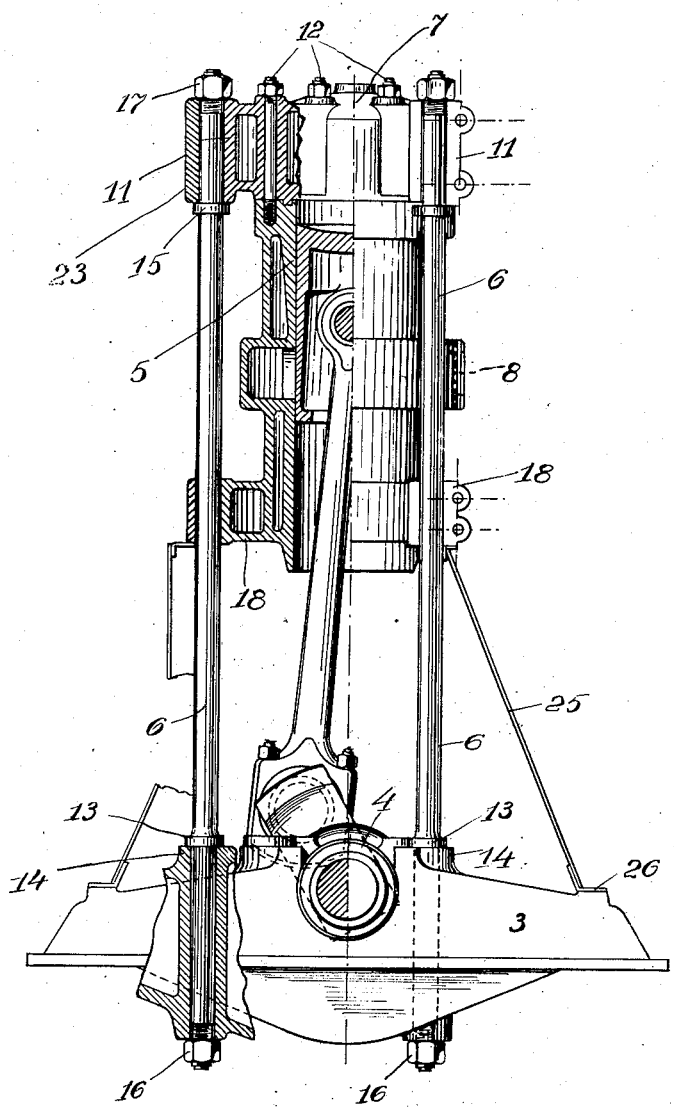

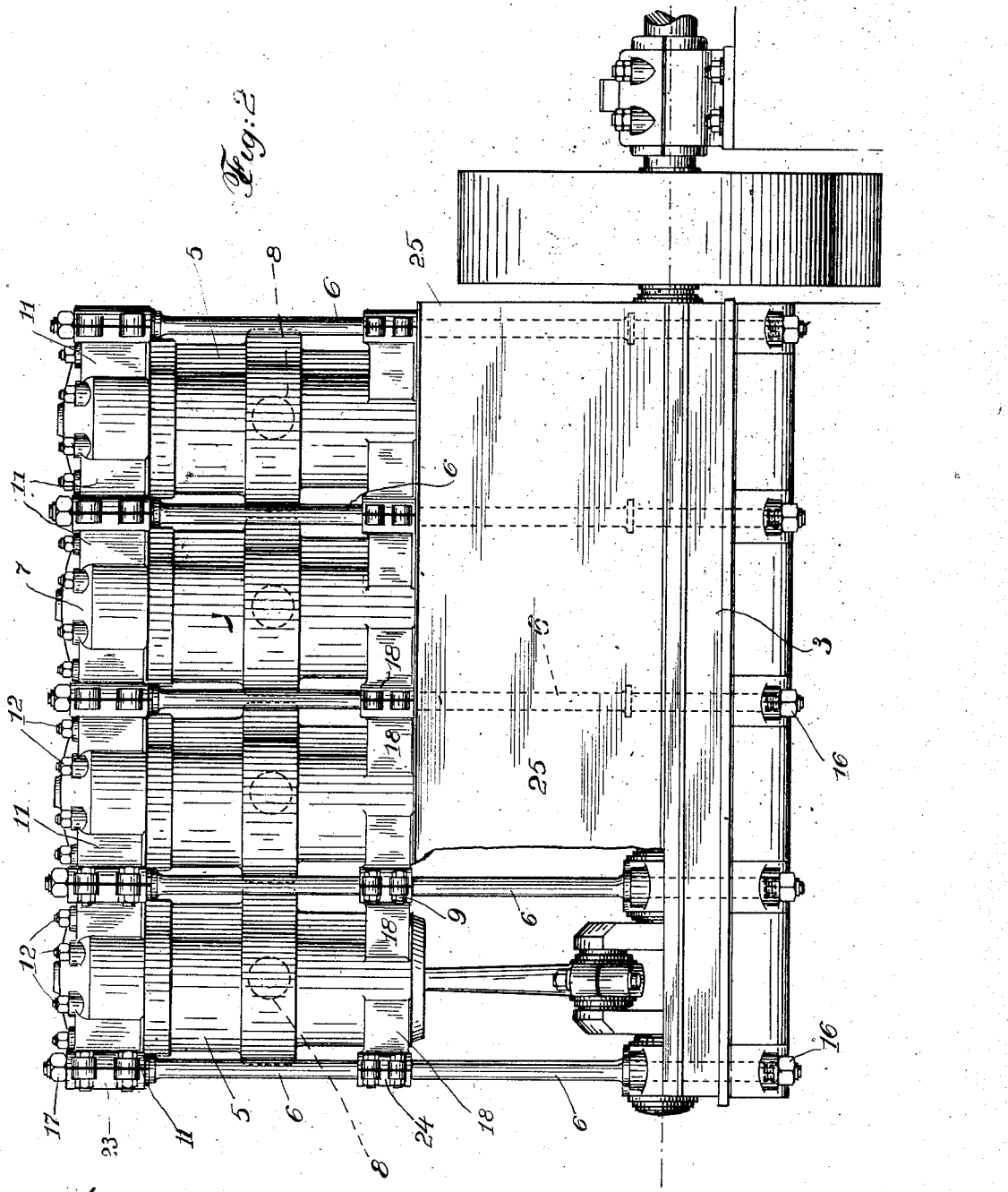

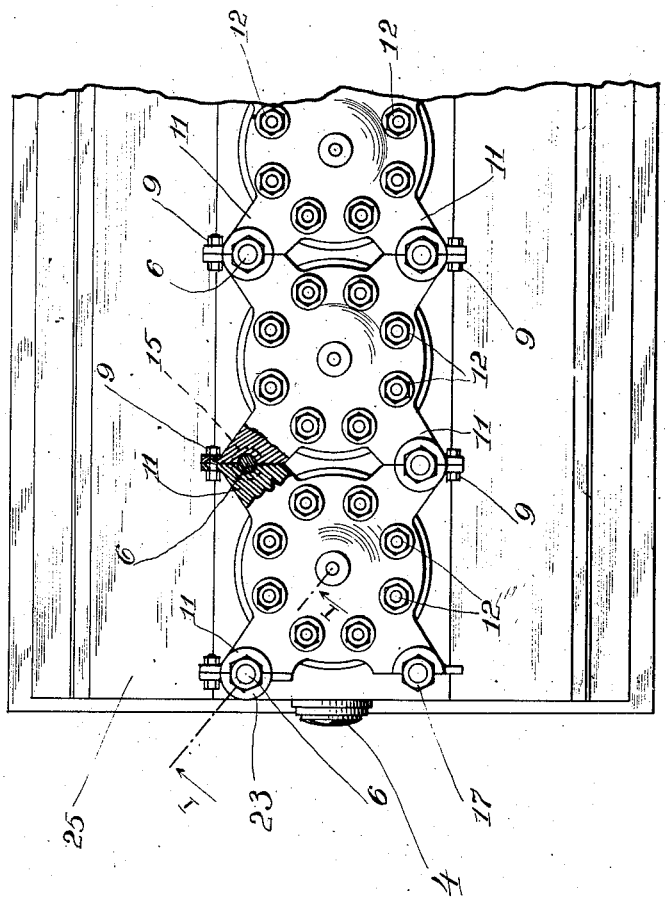

JULES COCHAND, OF ZURICH, SWITZERLAND, ASSIGNOR TO BUSCH-SULZER BROS.-DIESEL ENGINE COMPANY, OF ST. LOUIS, MISSOURI, A CORPORATION OF MISSOURI.

ENGINE CONSTRUCTION.

1,173,412.  Specification of Letters Patent.  Patented Feb. 29, 1916.

Application filed August 5, 1911. Serial No. 642,434.

*To all whom it may concern:*

Be it known that I, JULES COCHAND, a subject of the Swiss Republic, residing at Klausstrasse 19, Zurich V, in the Canton of Zurich, Switzerland, have invented certain new and useful Improvements in Engine Construction, of which the following is a full, true, and concise specification.

This invention is an improved construction of engine, in which the cylindrical walls of the engine cylinder or cylinders are relieved of the endwise and other complicated stresses occasioned by the expansion or combustion of the charge within the cylinder or by differences in its thermal expansion, and in which the necessity for large and intricate castings is eliminated and resulting economies in engine construction and efficiency are obtained.

In the drawings the invention is illustrated in connection with a two-cycle internal combustion engine, with which type the invention is most usefully employed, although it will be understood that it may be employed with advantage in any type of engine. In the two cycle engine the location of the exhaust and scavenging ports in the side walls of the cylinder tends to weaken the middle portion thereof and render it unsuitable for withstanding the strain of the expanding combustible, unless the cylinder is cast with considerable mass of metal around the port slits, and such construction is apt to be unreliable by reason of the unequal temperatures to which the different parts are subjected, and the corresponding unequal expansions and contractions resulting therefrom.

The present invention relieves the cylinder walls of the duty of resisting the expansion force and thereby permits them to be made of lighter and less complicated construction, especially around the port-slits, and produces various other beneficial results which will be apparent to those skilled in the art from a consideration of the description and claims which follow.

In the said drawings, Figure 1 is an end elevation with parts in section on line I—I of Fig. 3; Fig. 2 is a side elevation of the engine illustrated in Fig. 1; and Fig. 3 is a plan view of the same.

The engine is formed of a bed or foundation plate 3, upon which the crank-shaft 4 is journaled in suitable bearings. The cylinders 5, which may be separately formed, are secured to the frame or bed-plate 3 by means of a series of rods 6 which are secured to the latter and hold the cylinders by connections therewith at their combustion ends, preferably by direct engagement with the several cylinder heads 7. The opposite ends of the cylinders thus occupy the space between the rods, projecting inwardly toward the crank-shaft, being laterally supported by engagement with or upon the rods, whereby they may expand freely toward the crank-shaft.

The head 7 of each cylinder is separately formed and is provided with projecting lugs 11, by which it is connected to the rods 6, the latter being provided with shoulders 15 and nuts 17 for this purpose. Ordinarily four rods will be sufficient for one cylinder head and it will be understood that the valve-mechanism may be mounted directly upon the head if desired. Each cylinder 5 may be secured to its respective head 7, by means of an annular series of bolts 12 extending through the head and into the cylindrical wall of the cylinder for any suitable distance, being preferably tapped therein as shown.

Each cylinder is provided with appropriate scavenging and exhaust passages 8, midway of its length and is or may be water-cooled as shown in Fig. 1. The rods 6 may be secured to the bed-plate in any suitable manner, as for instance in the manner shown in the drawings wherein the bed-plate is provided with a number of perforated bosses 14 in which the rods rest by means of shoulders 13 formed thereon, the extremities of the rods being threaded and provided with nuts 16 by which the rods are rigidly clamped in position. With this arrangement, each cylinder head is rigidly secured to the bed-plate 3, and since each cylinder is rigidly secured to its corresponding head, its fixed position with respect to the crank-shaft is thus determined.

Each cylinder is provided with integrally formed lugs 18 located near the crank end of the cylinder and which are adapted to engage the rods 6 to form the lateral support therefor, for the purpose of preventing vibration and lateral displacement of the cylinder. Such support, however, is not intended to sustain the cylinder against longitudinal strain, and for this purpose the lugs are fastened to the rods in such manner that they may move thereon, serving merely as steadying guides.

In the engine illustrated, each of the cylinders is supported by four rods 6 and consequently each cylinder is provided with four guides 18 and each cylinder head is provided with four lugs 11. It will be understood that the number and position of the guides 16 and the lugs 11, may be varied as desired.

In the multicylinder engine shown the cylinders are bi-laterally symmetrical with reference to the disposition of the guides as shown in Fig. 3, and each guide has a flat face provided with a semi-cylindrical groove by which it has engagement with its rod. The flat faces of the guides on one cylinder are adapted to engage the corresponding faces of the guides of adjacent cylinders and to be bolted together with the rods between them, as shown clearly in Fig. 2 wherein the bolts are marked 9. In like manner each cylinder head 7 is bi-laterally symmetrical, with reference to the disposition of its supporting lugs 11, and each lug is formed with a flat face provided with a rod confining groove, so that it may be secured to the corresponding lug of an adjacent cylinder head with the rod between them and both resting on the shoulder 15 and clamped thereon by the nut 17.

With the foregoing arrangement the separate cylinders are successively secured to each other and coöperate with the rods 6 to form a rigid and stiff structure which will not be subject to distortion by lateral vibrations. It will be understood that the rods 6 may be secured to the foundation or that other means may be employed for securing the foundation plate 3 in place on the foundation.

The outer lugs 11, and the outer guides 18 of each of the outer cylinders of an assembled series, such as is shown in Fig. 2, are provided with plates 23 and 24, which are respectively bolted in place on the lugs and guides, so that they coöperate with them in engaging the rods 6 and in holding the end cylinders in place.

A crank-case 25 is located between the crank ends of the cylinders 5 and the bed-plate 3. The case may be formed of sheet metal, appropriately secured at one end to the plate 3, and at the other to the crank ends of the cylinders. The function of the case is primarily to inclose the crank-shaft and piston-rods and provide a splash casing for the engine, but it will be evident that it can also be relied upon to reinforce the rods 6 in a lateral direction. By separately forming the cylinder heads and the cylindrical portions of the cylinders and by making each cylinder bi-laterally symmetrical so that it is interchangeable with each of the other cylinders, the cost of construction and assembling is materially decreased.

It will be observed that the rods 6 are exposed to approximately constant temperature and are consequently of substantially uniform dimensions at all times, and therefore the position of the cylinder heads 7 is substantially fixed under all conditions of variations in the working temperatures of the cylinders. The clearance spaces within the cylinders are thus maintained constant, and the setting of the valve mechanisms which are secured to or carried by the cylinder heads is not liable to disarrangement.

It will be apparent that the cross-sectional area of the rods 6 may be varied, or that other means may be employed for securing the combustion end of the cylinders in place and relieving the cylinders of the longitudinal stresses occasioned by the working force of the motive fluid within the cylinders. It will also be apparent that the form and arrangement of the guides 18 may be varied and that the guides may be separately formed and secured to the cylinders in any suitable manner, without departing from the spirit and scope of my invention.

Claims:

1. In an internal combustion engine, a bed-plate, an upright water-jacketed cylinder having a head and mounted above and spaced from the bed-plate and upstanding means on the bed-plate secured to the upper end of the said cylinder for holding the same in place, the said means being outside the cylinder water-jacket and the lower end of said cylinder being free to expand toward the bed-plate.

2. In an engine the combination with the bed plate, cylinder and cylinder-head, of upstanding means for supporting the cylinder-head on the bed-plate independently of the support of the cylinder and separate means for securing the cylinder to its head.

3. An upright combustion engine comprising a frame or bed-plate supporting a set of rods or columns, a combustion cylinder having a head and also provided with a water-jacket between said rods, and being secured by its head end to the set of rods and having its crankshaft end free for endwise expansion and contraction.

4. A combustion engine comprising a frame supporting a set of rods or columns, a combustion cylinder having a water-jacket between said rods, the cylinder being secured to the set of rods by its combustion end, and having its crankshaft end laterally steadied by engagement with the rods and free for endwise movement relatively thereto.

5. A combustion engine comprising a bed-plate supporting a set of rods or columns, a crank-casing on the bed-plate surrounding the columns, and a combustion cylinder having a head and secured by its combustion end to the set of rods above the casing and having its crank-shaft end free to expand and contract endwise within the casing, the cylinder having a water-jacket between the rods.

6. A combustion engine comprising a bed or foundation plate, a casting, including a combustion cylinder and a water-jacket therefor, and a set of rods or columns secured to the bed-plate and to the combustion end of said casting, whereby the crankshaft end thereof is free to expand and contract endwise, means for laterally supporting this end of the casting and means for inclosing the space between this end of the casting and the bed plate.

7. A multicylinder combustion engine comprising a support for the crankshaft bearings, a set of rods or columns mounted thereon, a series of combustion cylinders supported by their combustion ends upon the series of rods with their crankshaft ends free to expand and contract endwise, the rods between adjacent cylinders forming a support common to both of them.

8. A multicylinder combustion engine comprising a bed-plate having a set of upright rods mounted thereon, a series of cylinders and means including the heads of such cylinders for securing the cylinders to the rods, the crankshaft ends of said cylinders being free for independent endwise movement and means for laterally supporting these ends of the cylinders upon the rods.

9. A multicylinder combustion engine comprising a crank-shaft and a support for same having two parallel rows of upright rods or columns, in combination with a series of combustion cylinders provided with means including their respective cylinder heads adapted to coact each with the like means of adjacent cylinders, to clasp the upper portions of the rods between them whereby the cylinders are supported by their combustion ends upon the rods, and similar coacting means on the adjacent cylinders for engaging the said rods and supporting the cylinders against lateral displacement.

10. In apparatus of the kind described a bed-plate provided with bearings for a crank-shaft and socketed to receive and support a set of upright rods or columns, a cylinder having a head and secured by lateral lugs at its upper end to said set of rods and being free at its lower end to move endwise relative thereto, in combination with a piston connected to the crank-shaft and working in the said cylinder.

11. Apparatus of the kind described comprising a bed plate, a set of rods or columns thereon, a removable cylinder head secured to the rods and thereby connected to the bedplate, and a cylinder secured to and supported by the said head independently of the rods, in combination with a crank-shaft on the bed-plate and a piston therefor in the cylinder.

In testimony whereof, I have signed this specification in the presence of two witnesses.

J. COCHAND.

Witnesses:
 CARL GUBLER,
 AUGUST RIVEGG.